United States Patent
Watanabe

(10) Patent No.: US 9,882,498 B2
(45) Date of Patent: Jan. 30, 2018

(54) SWITCHING POWER SUPPLY DEVICE, SWITCHING POWER SUPPLY CONTROL METHOD, AND ELECTRONIC APPARATUS

(71) Applicant: Sony Corporation, Tokyo (JP)

(72) Inventor: Hiroyuki Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 14/284,843

(22) Filed: May 22, 2014

(65) Prior Publication Data
US 2014/0355315 A1 Dec. 4, 2014

(30) Foreign Application Priority Data

May 29, 2013 (JP) ................................ 2013-112574

(51) Int. Cl.
*H02M 3/335* (2006.01)
*H02M 1/42* (2007.01)
*H02M 7/523* (2006.01)
*H02M 7/48* (2007.01)

(52) U.S. Cl.
CPC ...... *H02M 3/33546* (2013.01); *H02M 1/4241* (2013.01); *H02M 7/523* (2013.01); *H02M 2007/4815* (2013.01)

(58) Field of Classification Search
CPC .... Y02B 70/14; H02M 3/28; H02M 3/33546; H02M 2007/4815; H02M 2007/4811; H02M 7/4826; H02M 1/4241; H02M 7/523; H02M 2007/4818; H02M 3/335
See application file for complete search history.

(56) References Cited

U.S. PATENT DOCUMENTS

| 5,636,106 A * | 6/1997 | Batarseh | H02M 1/4208 323/222 |
| 5,739,622 A * | 4/1998 | Zaitsu | H02M 3/28 310/316.01 |
| 2011/0175584 A1* | 7/2011 | Huber | H02M 3/156 323/282 |
| 2012/0013322 A1* | 1/2012 | Dearborn | H02M 3/156 323/283 |
| 2012/0039378 A1* | 2/2012 | Nakayama | H02M 3/337 375/226 |
| 2012/0163037 A1* | 6/2012 | Hong | H02M 3/3387 363/21.02 |
| 2012/0182003 A1* | 7/2012 | Flaibani | H02M 3/156 323/284 |

(Continued)

FOREIGN PATENT DOCUMENTS

| JP | 06-46561 A | 2/1994 |
| JP | 2001-333576 A | 11/2001 |
| JP | 2006-204044 A | 8/2006 |

*Primary Examiner* — Gustavo Rosario Benitez
(74) *Attorney, Agent, or Firm* — Sheridan Ross P.C.

(57) ABSTRACT

A switching power supply device includes a switching element to which a DC input is supplied, a frequency control circuit which controls a switching frequency of the switching element, a frequency detection circuit which detects the switching frequency of the switching element, and a duty ratio control circuit which controls a switching duty ratio based on the frequency detected by the frequency detection circuit. The duty ratio control circuit controls the switching duty ratio such that the switching frequency becomes an approximately maximum frequency.

13 Claims, 10 Drawing Sheets

(56) References Cited

U.S. PATENT DOCUMENTS

2012/0250360 A1* 10/2012 Orr .................... H02M 3/3376
363/21.02
2013/0121037 A1* 5/2013 Peng ................... H02M 3/3376
363/21.03

* cited by examiner

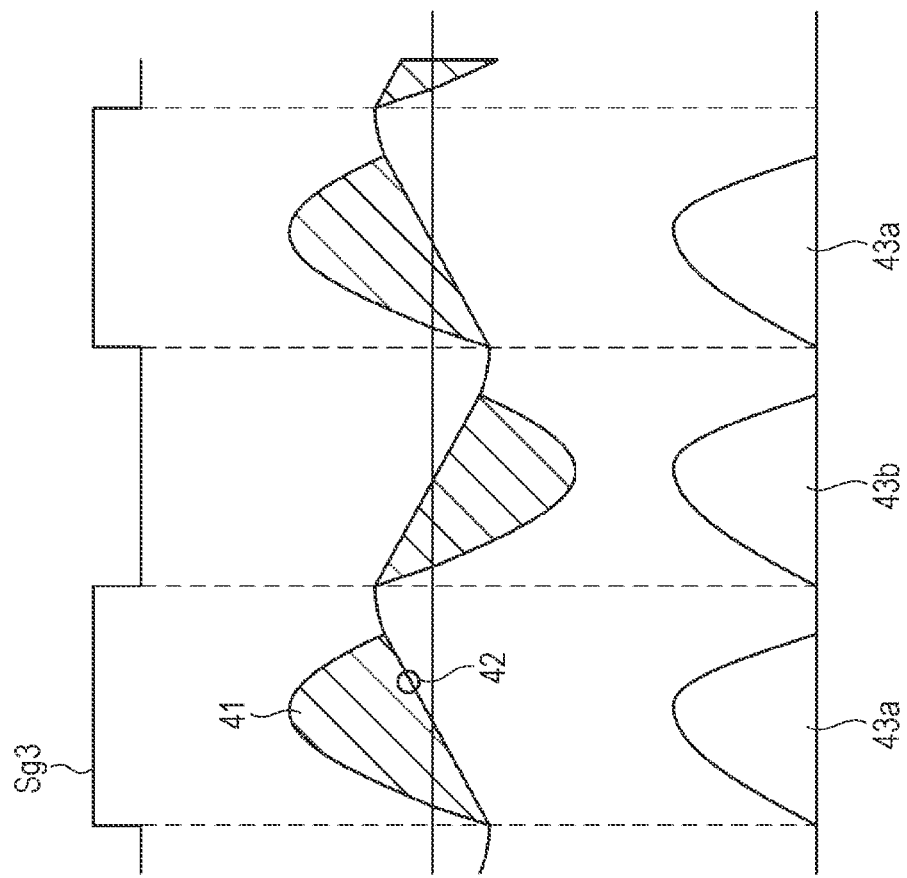

SWITCHING POWER SUPPLY DEVICE, SWITCHING POWER SUPPLY CONTROL METHOD, AND ELECTRONIC APPARATUS

CROSS REFERENCE TO RELATED APPLICATIONS

This application claims the benefit of Japanese Priority Patent Application JP 2013-112574 filed May 29, 2013, the entire contents of which are incorporated herein by reference.

BACKGROUND

The present disclosure relates to, for example, a current resonance type switching power supply device which outputs a stable DC voltage, a switching power supply control method, and an electronic apparatus.

As one switching power supply device, a current resonance type switching power supply device is known. The current resonance type switching power supply device has the following advantages.

1. Zero volt switching (ZVS) is performed in the entire load range of no load to a maximum load
2. A current at the time of turning off of a primary side switching element can be decreased
3. Zero current switching (ZCS) of a secondary side rectifying element is performed
4. Since it is possible to perform a voltage boosting operation without lowering efficiency at a normal time, the current resonance type switching power supply device is suitable for a power supply which is necessary to secure a retention time The current resonance type switching power supply device includes a switching circuit which has two switching elements connected in series. The two switching elements are alternately turned on and off. A transformer is connected to the switching elements, and an AC voltage, which is induced in the secondary side of the transformer, is rectified and becomes an output voltage.

In a case where a power conversion efficiency of the current resonance type switching power supply device is improved, it is necessary for a power loss of the transformer to be considered. The power loss occurring in the transformer is a sum of a copper loss of a wire caused by a resonance current and an excitation current through the primary side, and a transfer current to the secondary side and an iron loss of a transformer core caused by excitation of the transformer. It is common for the transformer to be optimally designed such that the sum of the copper loss and the iron loss at the time of the maximum load becomes a minimum value. For example, refer to a document (R. W. Erickson, D. Maksimovic: Fundamentals of power electronics, ed. Kluwer Academic Publishers, (2nd edition) ISBN 0792372700). In addition, in the following description, the power loss is abbreviated simply to "loss", and the power conversion efficiency is abbreviated simply to "efficiency".

The copper loss caused by both the resonance current and the transfer current is changed in magnitude by the load. In contrast, a sum of the copper loss caused by the excitation current and the iron loss is a constant value regardless of the load. Thus, when the load is a light load, the sum of the copper loss caused by the excitation current and the iron loss increases, and when an operation point the same as that at the time of the maximum load is set, the efficiency of the current resonance type switching power supply device in the light load is lowered compared to the efficiency of a quasi-resonance circuit or the like.

it has been proposed that whether the load is a light load or a heavy load is detected, an ON period of a switching element for switching is controlled depending on whether the load is a light load or a heavy load, and the operation point is moved, and thereby the efficiency is prevented from being lowered, as disclosed in Japanese Unexamined Patent Application Publication No. 6-46561, Japanese Unexamined Patent Application Publication No. 2006-204044, and Japanese Unexamined Patent Application Publication No. 2001-333576.

SUMMARY

As described above, in a case where efficiency is improved by controlling an ON period of a switching element, a pulse width modulation (PWM) control of controlling a duty ratio of a first switching element and a second switching element by fixing a switching frequency, a pulse ratio control (PRC) of adjusting the ON period of the first switching element by fixing the ON period of the second switching element, or the like, are used.

However, in a case of the above-described control, reduction degree of a copper loss caused by excitation current, and an iron loss is changed depending on a fixed value of the frequency, or a fixed value of the ON period of the second switching element. Thus, in order to minimize the loss of a transformer, it is necessary to precisely adjust the fixed value of the frequency, or the fixed value of the ON period of the second switching element, and this is difficult to design. Further, since a condition for minimizing the loss of the transformer is also changed when the load is changed, it is not possible to minimize the loss of the transformer in the entire load range.

Thus, it is desirable to provide a switching power supply device, a switching power supply control method, and an electronic apparatus which can control an ON period of a switching element so as to minimize a loss of a transformer and can control the ON period of the switching element for minimizing the loss of the transformer in the entire load range.

According to an embodiment of the present disclosure, a switching power supply device includes a switching element to which a DC input is supplied, a frequency control circuit which controls a switching frequency of the switching element, a frequency detection circuit which detects the switching frequency of the switching element, and a duty ratio control circuit which controls a switching duty ratio based on the frequency detected by the frequency detection circuit. The duty ratio control circuit controls the switching duty ratio such that the switching frequency becomes an approximately maximum frequency.

Further, the present disclosure provides the switching power supply device in which the duty ratio control circuit operates using the switching duty ratio in an area where a slope of a change of the switching frequency with respect to a change of the switching duty ratio becomes positive.

According to the present disclosure, it is possible to minimize a loss of a transformer in the entire load range. Since even when a load fluctuates, the loss is automatically adjusted to a minimum frequency and a minimum duty ratio, it is possible to expect an efficiency improving effect in the entire load range.

BRIEF DESCRIPTION OF THE DRAWINGS

FIG. 4A to 4C are waveform diagrams for explaining the switching power supply device of the related art;

DETAILED DESCRIPTION OF EMBODIMENTS

Hereinafter, embodiments will be described. In addition, the description will be made in the following order.
1. Current Resonance Type Switching Power Supply Device
2. Problems of Switching Power Supply Device of Related Art
3. First Embodiment of Present Disclosure
4. Second Embodiment of Present Disclosure
5. Application Example
6. Modification Example In addition, embodiments described below are suitable specific embodiments, and various technically preferable limitations are given. However, in the following description, a scope of the present disclosure is not limited to the embodiments, unless there is a description to the effect that the present disclosure is particularly limited.

1. Current Resonance Type Switching Power Supply Device

Figure 1:
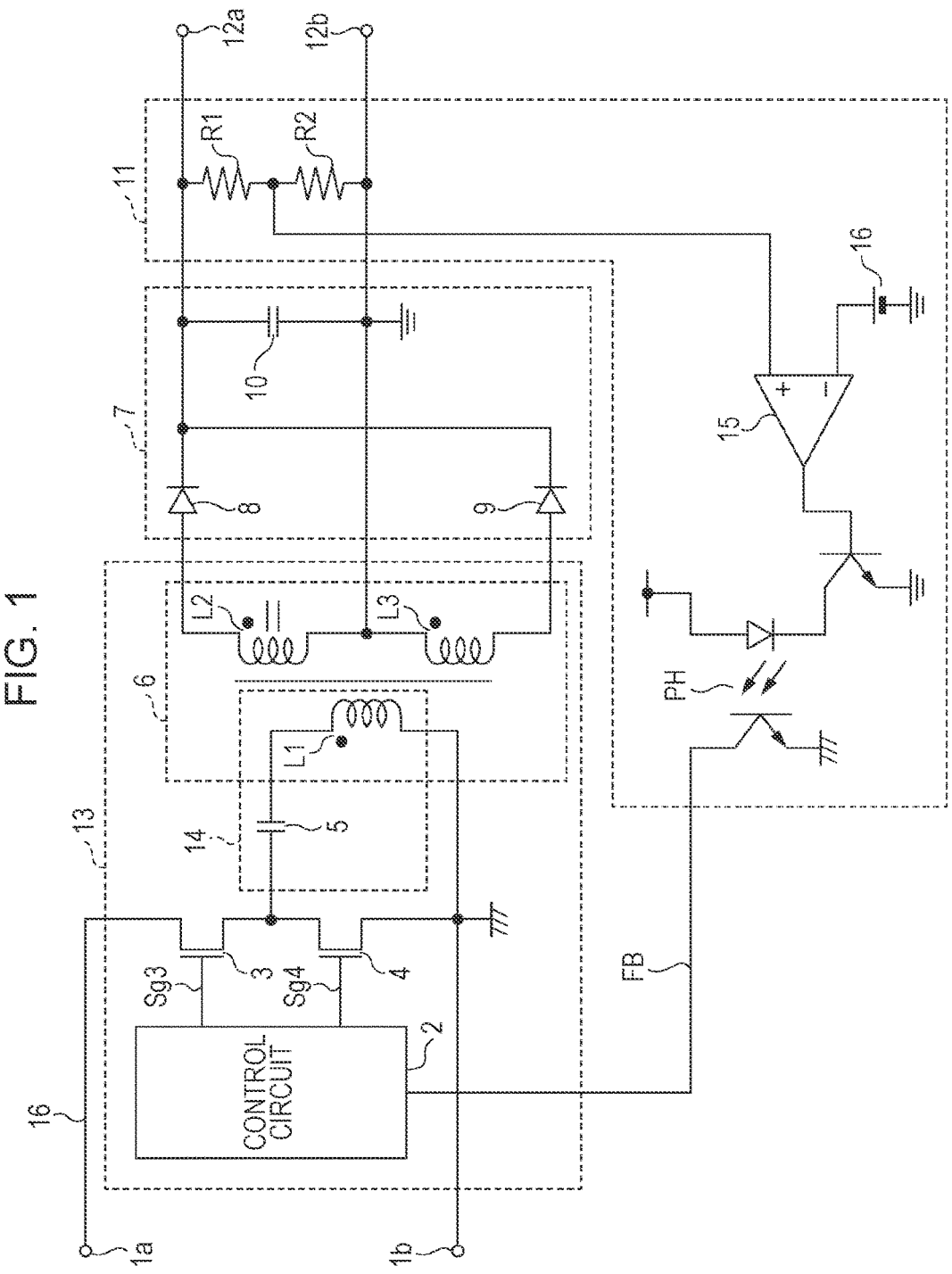
FIG. 1 is a connection diagram of a current resonance type switching power supply device to which the present disclosure can be applied.

As an example, a voltage +B which is obtained by rectifying an AC supply voltage (commercial supply voltage) is supplied to input terminals 1a and 1b of a current resonance type switching power supply device illustrated in FIG. 1. For example, a PFC controlled switching power supply device which rectifies the commercial supply voltage is connected to the input terminals 1a and 1b. In a switching operation of the current resonance type switching power supply device, two switching elements are alternately turned on and off, and both form a dead band which is an off period. The dead band is provided to avoid simultaneous turning-on of the two switching elements.

FIG. 1 illustrates a configuration of a current resonance type converter which includes two field effect transistors (FET) 3 and 4 as switching elements. In order to perform switching operations of the FET 3 and the FET 4, a control circuit 2 is provided, and the FET 3 and the FET 4 are respectively switched by switching control signals Sg3 and Sg4 from the control circuit 2. In addition, the power supply device illustrated in FIG. 1 employs a configuration of operating the switching elements using separate excitation.

A series resonance circuit 14 which is configured by a capacitor 5 and a primary coil L1 of a transformer 6 is connected to a connection point of the FETs 3 and 4. The control circuit 2, the FETs 3 and 4, the capacitor 5, and the transformer 6 configure a current resonance circuit 13.

A connection point of secondary coils L2 and L3 of the transformer 6 becomes a ground potential in a secondary side. A rectification circuit 7 is configured with diodes 8 and 9 and a capacitor 10 for smoothing, and an output voltage of the rectification circuit 7 is output to the output terminals 12a and 12b. For example, a DC voltage of 12 V is output. The rectification circuit 7 is a full-wave rectification circuit, rectifies an alternating voltage which is excited in the secondary coil, and generates an output DC voltage which is a voltage at both ends of the capacitor 10.

The output voltage is divided by resistors R1 and R2 which are included in an error signal generation circuit 11, and the divided voltage is supplied to a voltage amplification 15 and compared with a voltage of a predetermined voltage source 16. According to the compared output, a current ID flows through a light emitting diode side of a photo coupler PH. A feedback current FB which is proportional to the current ID flows through a photo transistor side of the photo coupler PH. The feedback current FB is supplied to the control circuit 2.

Figure 2:
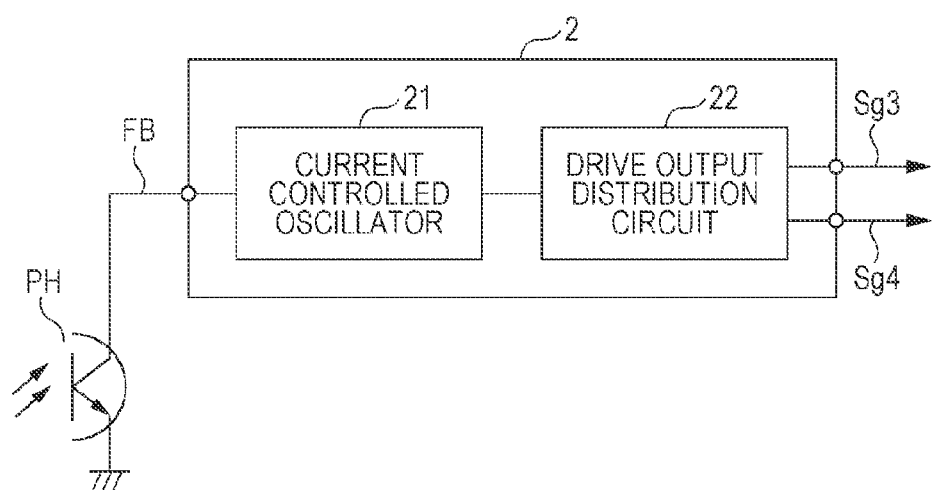
FIG. 2 is a block diagram of a control circuit in a switching power supply device of the related art.

As illustrated in FIG. 2, the control circuit 2 in the switching power supply device of the related art is configured from a current controlled oscillator 21 and a drive output distribution circuit 22. The feedback current FB is supplied via the photo coupler PH to a control input terminal of the current controlled oscillator 21. The current controlled oscillator 21 generates a signal of frequency according to the feedback current FB. In addition, instead of the current controlled oscillator 21, a voltage controlled oscillator which controls an oscillation frequency using the feedback voltage may be used. Switching control signals Sg3 and Sg4 are generated by a drive output distribution circuit 22 for the FET 3 and the FET 4, respectively.

Figure 3:
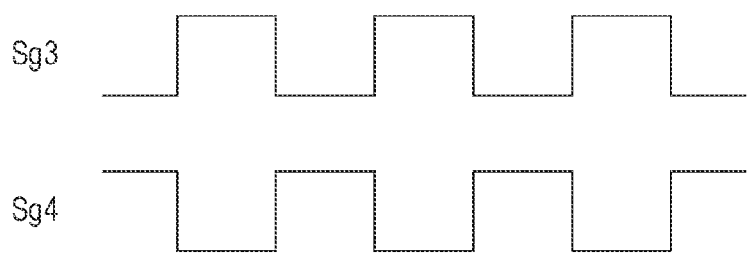
FIG. 3 is a waveform diagram illustrating waveforms of switching control signals of a switching power supply device of the related art.

As illustrated in FIG. 3, the switching control signals Sg3 and Sg4 are pulse signals, each of which has a phase of approximately 180° different from each other, in a state where a switching duty ratio is approximately 50%. While the switching control signal Sg3 is at a high level, the FET 3 is on, and while the switching control signal Sg3 is at a low level, the FET 3 is off. On and off of the FET 4 have a reverse phase. In addition, in the following description, the switching frequency is simply termed "frequency", and the switching duty ratio is simply termed "duty".

The control circuit 2 controls the output voltage of the rectification circuit 7 to be constant by controlling the oscillation frequency, according to a magnitude of the feedback current FB from the error signal generation circuit 11. For example, either if a load connected between the output terminals 12a and 12b is heavy, or if the input voltage supplied via the input terminals 1a and 1b is low, the output voltage of the rectification circuit 7 becomes low. In this case, in order to constantly maintain the output voltage of the rectification circuit 7, the feedback current FB which is the output signal of the error signal generation circuit 11 is adjusted such that the frequency is decreased. As a result, an amount of energy transfer to the secondary side is increased, thereby increasing the output voltage. In contrast, when a level of the output voltage becomes high, the frequency is controlled so as to become high. As a result, the amount of energy transfer to the secondary side is decreased, thereby decreasing the output voltage.

FIG. 4A illustrates a waveform of the switching control signal Sg3. A resonance current (denoted by hatched areas 41 in FIG. 4B) generated by a resonance of a leakage inductance of the transformer 6 and the capacitor 5, and an excitation current 42 generated when a voltage is applied to an excitation inductance of the transformer 6 flows through the primary side of the transformer 6, and a transfer current, which is proportional to the resonance current, flows through the secondary side. In FIG. 4C, 43a is a transfer current flowing through the secondary coil L2 of the transformer 6, and 43b is a transfer current flowing through the secondary coil L3 of the transformer 6. Such transfer currents 43a and 43b are rectified by the rectification circuit 7 and thereby the output voltage is generated. Thus, the current resonance type switching power supply device transfers power from the primary side to the secondary side, as an isolation type DC-DC converter.

2. Problem of Switching Power Supply Device of Related Art

In such a current resonance type switching power supply device, in a case where power conversion efficiency is improved, it is necessary for a power loss of the transformer 6 to be considered. The power loss occurring in the transformer 6 is a sum of a copper loss of wires caused by the resonance current and the excitation current through the primary side and the transfer current to the secondary side, and an iron loss of a transformer core caused by exciting the transformer.

Figure 5A:
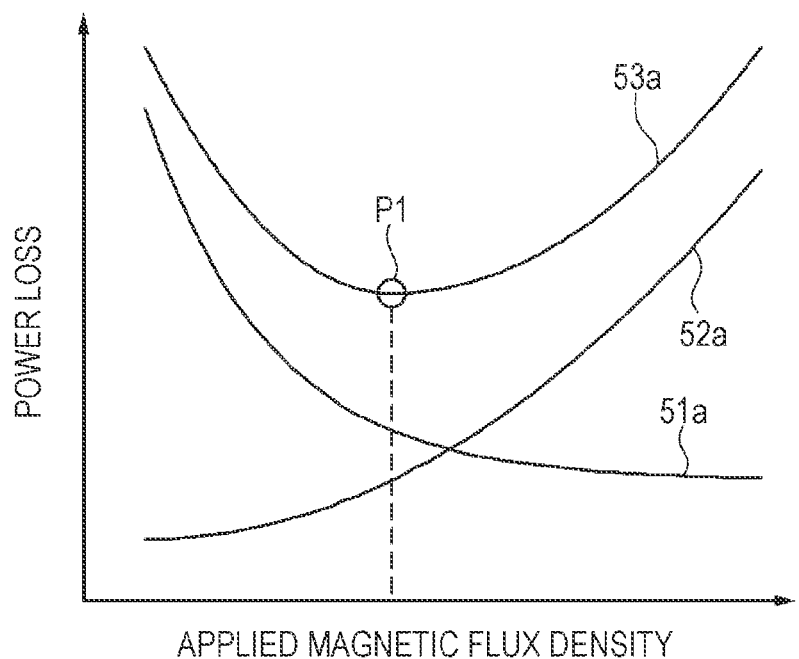
FIGS. 5A and 5B are schematic line charts used in explaining a loss of a switching power supply device.

FIG. 5A is a graph illustrating an example of a change of the power loss with respect to applied magnetic flux density at the time of a maximum load. A curve 51a illustrates the copper loss caused by both the resonance current through the primary side and the transfer current to the secondary side. A curve 52a illustrates a sum of the copper loss caused by the exciting current and the iron loss of the transformer core. Further, a curve 53a is a curve illustrating a total loss in which the two curves 51a and 52a are combined.

Figure 5B:
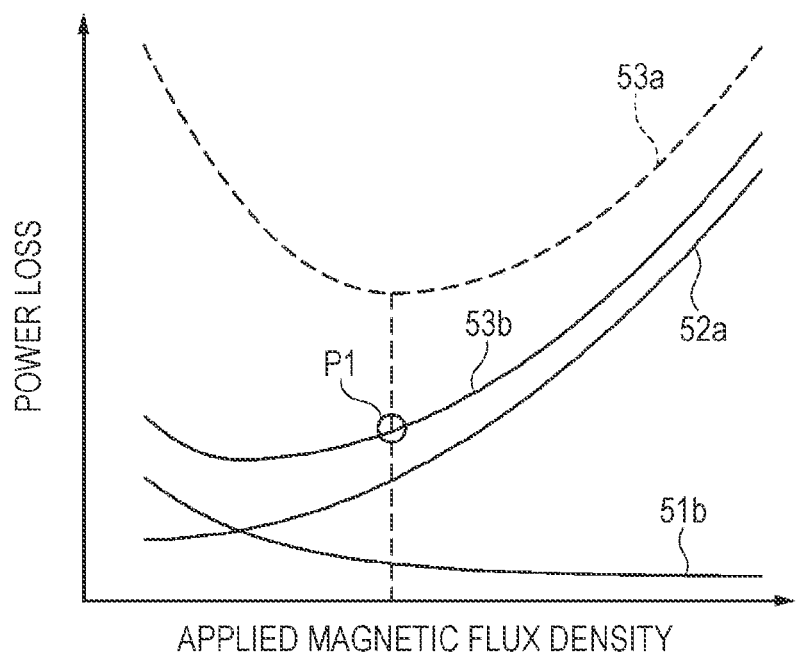

Thus, as illustrated as an operation point P1 in the curve 53a, an optimal design is generally performed in balance such that the sum of the copper loss and the iron loss is minimized at the time of the maximum load. The copper loss (curve 51a) caused by the resonance current and the transfer current is changed in magnitude by the load. FIG. 5B is a graph illustrating an example of a change of the power loss with respect to applied magnetic flux density at the time of a light load. At the time of the light load, the copper loss caused by the resonance current and the transfer current is illustrated as the curve 51b. In contrast, the sum (curve 52a) of the copper loss caused by the excitation current, and the iron loss is an approximately constant value regardless of the load.

Thus, in a case of the light load, as illustrated in FIG. 5B, a ratio of the sum of the copper loss caused by the excitation current and the iron loss is increased, and the curve illustrating the total loss in which the two curves 51b and 52a are combined is illustrated as the curve 53b. Thus, if the operation point P1 identical to that at the time of the maximum load is set, the efficiency of the current resonance type switching power supply device is deteriorated compared to the efficiency of a power supply or the like of a fly-back method, in the light load.

In order to avoid such a problem, Japanese Unexamined Patent Application Publication No. 6-46561, Japanese Unexamined Patent Application Publication No. 2006-204044, and Japanese Unexamined Patent Application Publication No. 2001-333576, which are presented at the beginning, propose that it is determined whether the load is a light load or a heavy load, an ON period of the FET for switching is controlled depending on whether the load is a light load or a heavy load, and the efficiency is prevented from being decreased.

Figure 6:
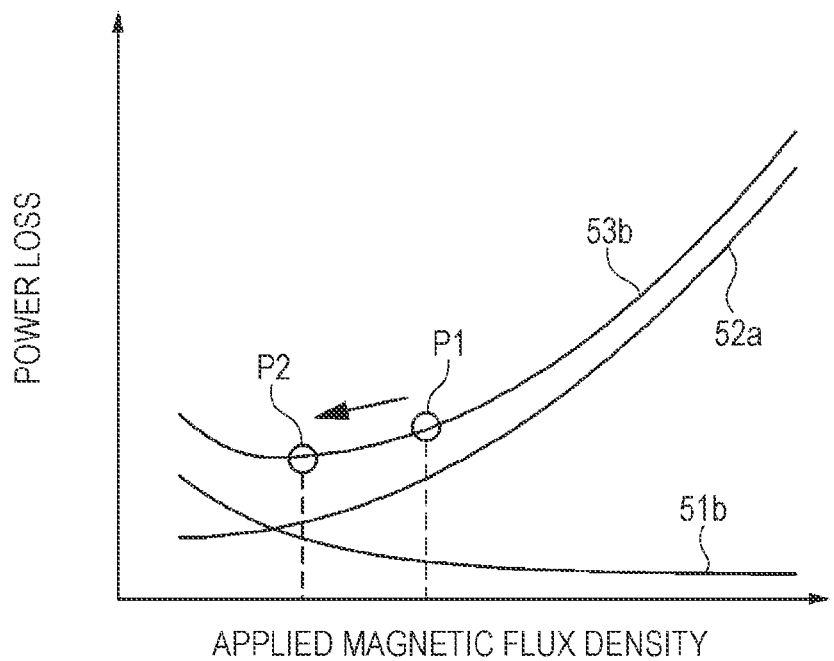
FIG. 6 is a schematic line chart used in explaining an efficiency improving method of the related art.

That is, in FIG. 6, at the time of a load other than the light load, the operation point P1 is set, and an ON period of a first FET and an ON period of the second FET are controlled so as to be equal to each other. At the time of the light load, the ON period of the first FET becomes short, and the ON period of the second FET becomes long. In this way, at the time of the light load, the ON periods of the FETs are changed, and thereby the operation point P2 is set by decreasing the magnetic flux density applied to the transformer, as illustrated in FIG. 6. As a result, the copper loss caused by the excitation current and the iron loss is decreased.

However, in a case of control described above, depending on a fixed value of the frequency or a fixed value of the ON period of the second FET, a degree capable of decreasing the copper loss caused by the excitation current and the iron loss, is changed. Thus, in order to minimize the loss of the transformer, it is necessary to precisely adjust the fixed value of the frequency or the fixed value of the ON period of the second FET, and accordingly the design is difficult. Further, when the load is changed, the condition in which the loss of the transformer is minimized is changed, and it is difficult to minimize the loss of the transformer in the entire load range.

3. First Embodiment of Present Disclosure

Hereinafter, a first embodiment of the present disclosure will be described.

In the first embodiment, a circuit configuration and a circuit connection are the same as those of the current resonance type switching power supply device of the related art as illustrated in FIG. 1. However, in the control circuit 2 of the related art, the duty ratio is fixed to 50%, and the switching control signal with a modulated frequency is generated. In the present disclosure, the control circuit 2 sets the duty ratio as a variable value equal to or less than 50%, and modulates the frequency. To set the duty ratio equal to or less than 50% is to set the ON period of the FET 3 on a high side shorter than the ON period of the FET 4 on a low side.

Method of Determining Duty Ratio

Figure 7:
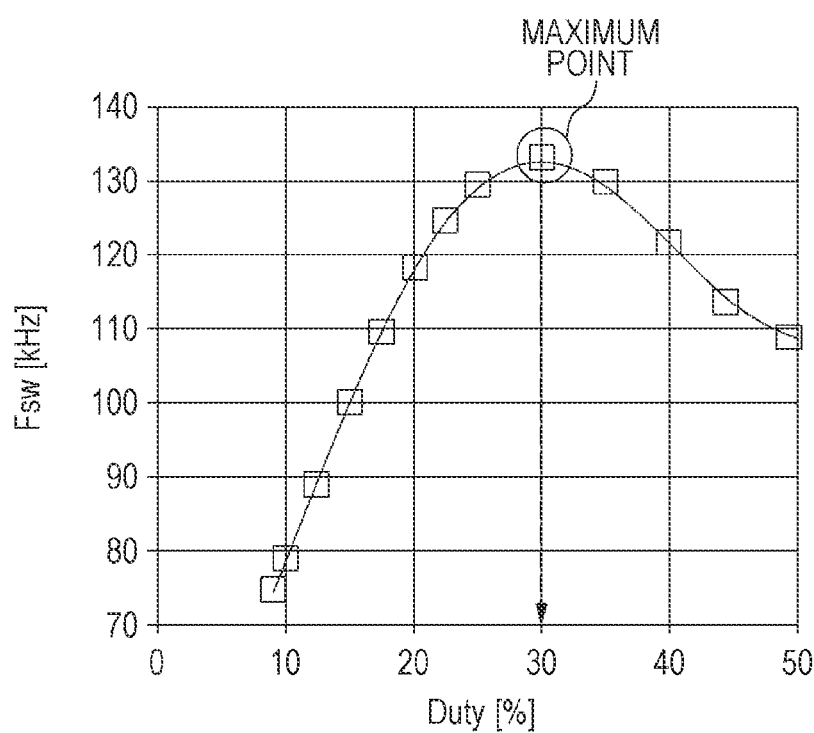
FIG. 7 is a schematic line chart used in explaining an efficiency improving method according to an embodiment of the present disclosure.

FIG. 7 is a graph illustrating a relationship between the duty ratio and the frequency $F_{SW}$ of the switching control signal when the switching power supply device operates. Since when the duty ratio is decreased, the energy transferred to the secondary side is decreased, the frequency is decreased, and since when the duty ratio is increased, the energy transferred to the secondary side is increased, the frequency is increased, and thus the output voltage is stabilized.

In the first embodiment of the present disclosure, in the graph of FIG. 7, the control circuit 2 tracks the duty ratio in such a manner that the maximum frequency is typically used. That is, in the graph illustrating the relationship between the frequency and the duty ratio, the duty ratio is adjusted by an algorithm to find a duty cycle with the maximum frequency. A time of changing the duty ratio is sufficiently longer than a response time which is determined from a feedback band of the output voltage. That is, a change of the duty ratio is delayed with respect to fast feedback of the output voltage. The reason is that since a frequency for maintaining the output voltage constant is also different with respect to a different duty ratio, it is not possible to stably maintain the output voltage, when the change of the duty ratio is too fast.

Relationship Between Frequency and Efficiency

A reason that the efficiency is improved by setting the duty ratio in such a manner that the frequency becomes a maximum value, as described above, will be described.

Figure 8A:
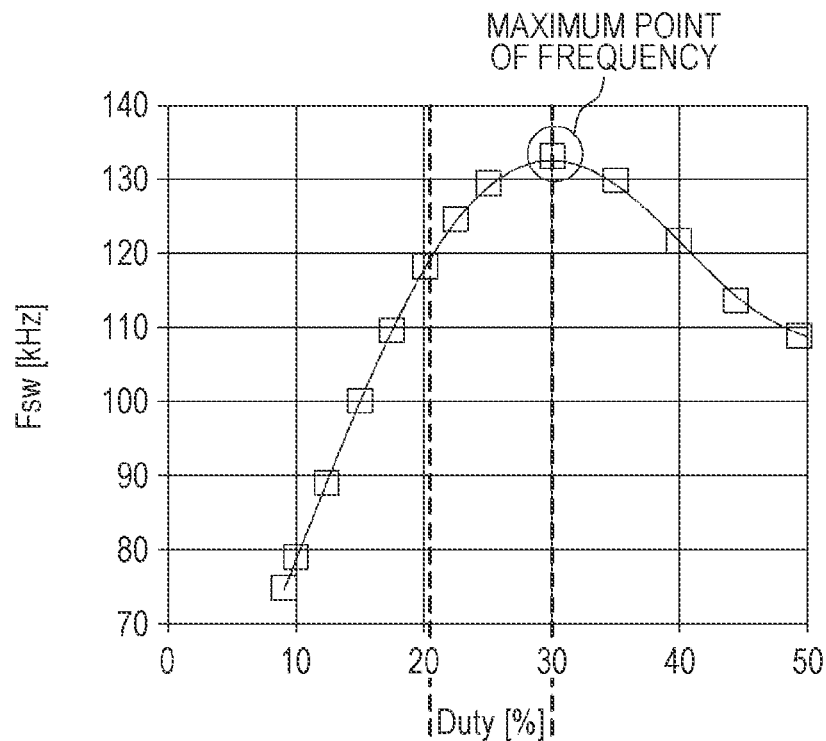
FIGS. 8A and 8B are schematic line charts used in explaining an efficiency improving method according to an embodiment of the present disclosure.
Figure 8B:
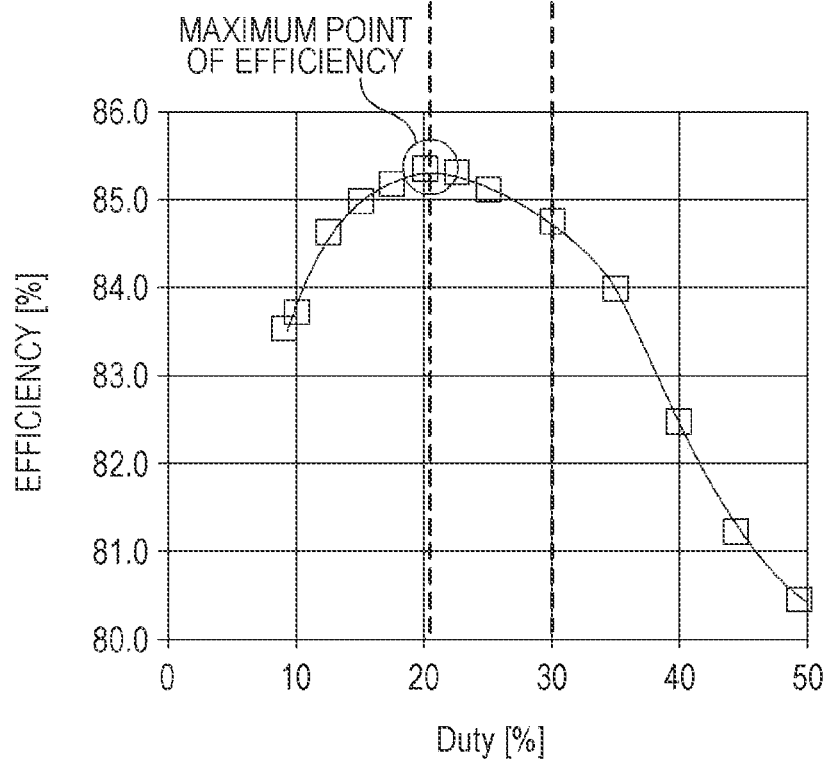

FIG. 8A is a graph illustrating a relationship between the frequency and the duty ratio in a case of the light load, and FIG. 8B is a graph illustrating a relationship between the efficiency and the duty ratio. Here, in a case where when the duty ratio is minutely changed, the frequency is increased, the loss of the transformer is decreased. The reason will be described below.

That is, the iron loss which occupies the greater part of the loss of the transformer has a strong positive correlation with the applied magnetic flux density, and the applied magnetic flux density of the transformer is reversely proportional to the frequency. In general, in a case of a ferrite core, it is proportional to the magnetic flux density to the power of 2.6 to 2.8. For this reason, as a result of the duty ratio which is minutely changed, in a case where the frequency is increased, it is possible to decrease the loss of the transformer, and to improve the efficiency of the switching power supply device. Here, when the frequency is increased, switching losses of the FETs 3 and 4 are increased. When the frequency is approximately 100 kHz, a condition that an amount of increase of the switching losses is decreased compared to an amount of decrease of the above-described loss of the transformer, is satisfied, and thus the efficiency can be improved. In addition, in a case of a load other than the light load, the efficiency is best when the duty ratio is approximately 50%.

With Regard to Shift Between Maximum Point of Frequency and Maximum Point of Efficiency There is a case where shift occurs between a duty ratio (FIG. 8A) in which the frequency becomes a maximum value and a duty ratio (FIG. 8B) in which the efficiency becomes a maximum value. That is, the duty ratio in which the efficiency becomes a maximum value is positioned at an area of the duty ratio lower than the duty ratio in which the frequency becomes a maximum value. This is due to an influence of the switching losses as described below.

In general, the switching loss increases with increase of the frequency. In FIG. 8A, when the duty ratio is changed to be lower than the duty ratio in which the frequency becomes a maximum value, the frequency is decreased, and thus the loss of the transformer increases, while the switching loss decreases. At this time, in a case where an amount of decrease of the switching loss is greater than an amount of increase of the loss of the transformer, the total loss of the switching power supply device is decreased. Thus, the shift occurs between the duty ratio in which the frequency becomes a maximum value and the duty ratio in which the efficiency becomes a maximum value.

That is, since a condition where an amount of change of the switching loss caused by a frequency change is small with respect to the change of the loss of the transformer, is not satisfied in an area where the frequency is high to some extent, the duty ratio in which the frequency becomes a maximum value does not match the duty ratio in which the efficiency becomes a maximum value. However, since an influence of the loss caused by the shift is extremely small, it is practical to find the duty ratio in such a manner that the frequency becomes a maximum value. As another method, taking into account the shift of the maximum point of the frequency and the maximum point of the efficiency, the duty ratio lower than the duty ratio in which the frequency becomes a maximum value may be found.

Example of Control Circuit

Figure 9:
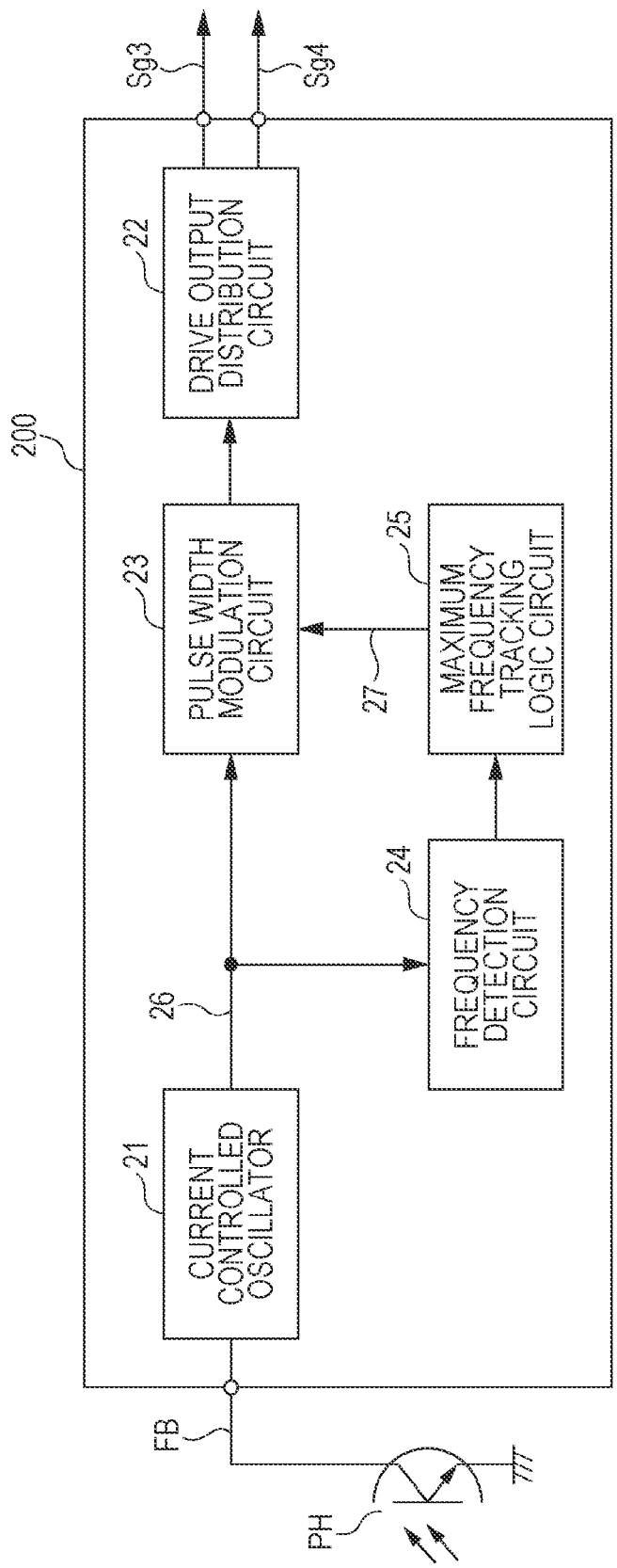
FIG. 9 is a block diagram of a control circuit in a switching power supply device according to an embodiment of the present disclosure.

FIG. 9 illustrates a block diagram of a control circuit 200 in the first embodiment of the present disclosure. In order to be distinguished from the control circuit 2 of the related art, the control circuit is termed a control circuit 200. The control circuit 200 is configured with a current controlled oscillator 21, a pulse width modulation circuit 23, a drive output distribution circuit 22, a frequency detection circuit 24, and a maximum frequency tracking logic circuit 25. The feedback current FB is supplied via the photo coupler PH to the control input terminal of the current controlled oscillator 21. The current controlled oscillator 21 generates a frequency signal 26 with a frequency according to the feedback current FB. The switching control signals Sg3 and Sg4 are respectively generated for the FET 3 and the FET 4 by the drive output distribution circuit 22.

The frequency signal 26 from the current controlled oscillator 21 is supplied to the pulse width modulation circuit 23 and the frequency detection circuit 24. The frequency detection circuit 24 measures the frequency and supplies the maximum frequency tracking logic circuit 25 with the information on the measured frequency. The maximum frequency tracking logic circuit 25 supplies the pulse width modulation circuit 23 with a duty signal 27 resulting from signal processing thereof.

The pulse width modulation circuit 23 supplies the drive output distribution circuit 22 with a square wave modulated based on the frequency signal 26 from the current controlled oscillator 21 and the duty signal 27. The drive output distribution circuit 22 generates AC signals with two square waves which have a certain duty ratio and reverse phases different from each other, that is, the switching control signals Sg3 and Sg4, and supplies each gate of the FETs 3 and 4 with the signals.

Figure 10:
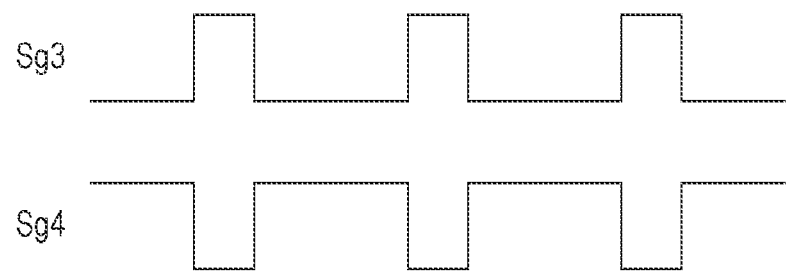
FIG. 10 is a waveform diagram illustrating waveforms of switching control signals of a switching power supply device according to an embodiment of the present disclosure.

As illustrated in FIG. 10, the switching control signal Sg3 is a pulse signal with a switching duty ratio less than 50%. The other switching control signal Sg4 is a pulse signal which is obtained by reversing the switching control signal Sg3. While the switching control signal Sg3 is at a high level, the FET 3 is on, and while the switching control signal Sg3 is at a low level, the FET 3 is off. ON and OFF of the FET 4 are reversed to those of the FET 3.

The control circuit 200 receives the feedback signal FB for controlling the frequency as a control signal, in order to maintain the output voltage constant. The current controlled oscillator 21 adjusts the frequency according to the received feedback signal FB, and supplies the pulse width modulation circuit 23 and the frequency detection circuit 24 with the frequency signal 26 as the output signal. The frequency detection circuit 24 measures the frequency and supplies the maximum frequency tracking logic circuit 25 with the information on the measured frequency. The maximum frequency tracking logic circuit 25 supplies the pulse width modulation circuit 23 with the duty signal 27 resulting from the signal processing.

The pulse width modulation circuit 23 supplies the drive output distribution circuit 22 with the square wave modulated based on the frequency signal 26 and the duty signal 27. The drive output distribution circuit 22 generates AC signals with two square waves which have a certain duty ratio and reverse phases different from each other, that is, the switching control signals Sg3 and Sg4, such as those illustrated in FIG. 10, and supplies each gate of the FETs 3 and 4 with the signals.

Processing of Maximum Frequency Tracking Logic Circuit

Figure 11:
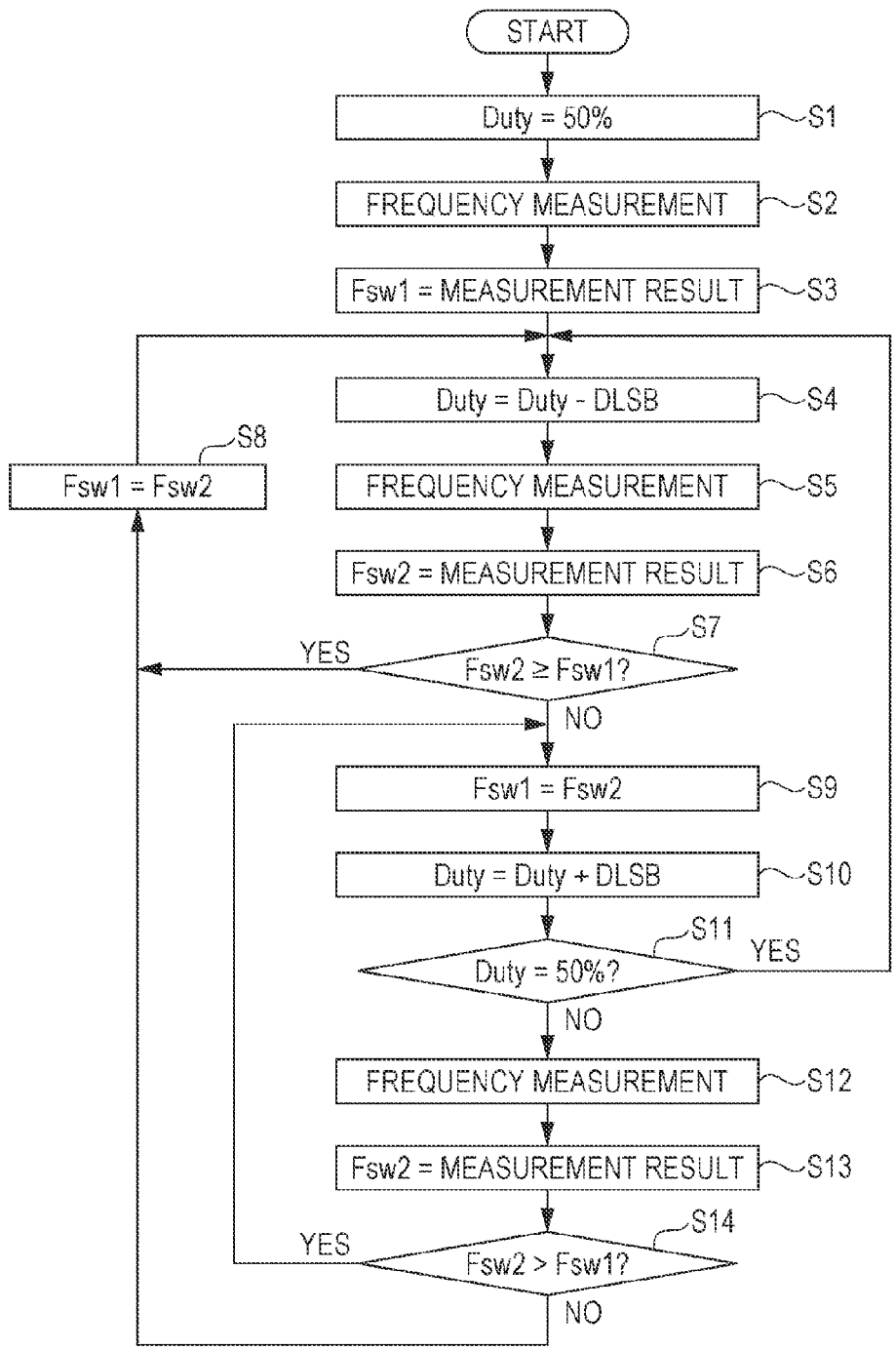
FIG. 11 is a flow chart for explaining control processing of a switching power supply device according to a first embodiment of the present disclosure.

The maximum frequency tracking logic circuit 25 searches for a duty cycle in which the frequency typically becomes a maximum value in the entire load range, and the duty ratio of the pulse signal becomes the searched duty ratio. Thus, it is unnecessary to detect a degree of the load. An operation of the maximum frequency tracking logic circuit 25 will be described with reference to a flow chart illustrated in FIG. 11. In addition, control processing illustrated in the flow chart can be realized by digital signal processing such as a microcontroller or an FPGA.

Step S1: The duty ratio at the instant when the switching operation starts is set to 50% in the same manner as in the related art.

Step S2: In this state, the frequency immediately before the duty is changed, is measured.

Step S3: The measured frequency value is substituted for Fsw1, which is a variable.

Step S4: Next, the duty ratio is decreased by an amount of change which is previously set. The amount of change is referred to as DLSB.

Step S5: Thereafter, the frequency is measured after the duty ratio is changed.

Step S6: The measured frequency value is substituted for Fsw2, which is a variable.

Step S7: It is determined whether or not Fsw2 is equal to or greater than Fsw1.

Step S8: In a case where the determined result of step S7 is positive, it means that the frequency becomes high or is not changed by decreasing the duty ratio, and in this case, Fsw2 is substituted for Fsw1. Then the control processing proceeds to the above-described step S4.

By a loop (of step S4→step S5→step S6→step S7→step S8→step S4), the control is performed such that the duty ratio is decreased, as long as the frequency is not lowered.

Step S9: In a case where the determined result of step S7 is negative, it means that the frequency is lowered by decreasing the duty ratio. In this case, Fsw2 is substituted for Fsw1, and the control processing proceeds to step S10.

Step S10: The duty ratio is increased by the DLSB that is an amount of change which is previously set.

Step S11: Here, it is determined whether or not the set value of the duty ratio is 50%. In a case where the determined result of step S11 is positive, the duty ratio is set so as not to be equal to or greater than 50%, and the control processing proceeds to step S4.

Step S12: In a case where the determined result of step S11 is negative, the frequency is measured after the duty ratio is changed.

Step S13: The measured frequency is substituted for Fsw2.

Step S14: It is determined whether or not Fsw2 is greater than Fsw1.

In a case where the determined result of step S14 is positive, it means that the frequency becomes high by increasing the duty ratio. In this case, the control processing returns to step S9, Fsw2 is substituted for Fsw1, and further, the control processing proceeds to step S10.

By a loop (of step S10→step S11→step S12→step S13→step S14→step S9→step S10), the operation is performed such that the duty ratio is increased, as long as the frequency becomes high.

In a case where the determined result of step S14 is negative, it means that the frequency is lowered or not changed by increasing the duty ratio. In this case, Fsw2 is substituted for Fsw1 (step S8), the control processing returns, and further, the control processing proceeds to step S4.

By the above-described control processing, it is possible for the maximum frequency tracking logic circuit 25 to find the duty ratio in which the frequency typically becomes the maximum value.

According to the first embodiment, the following operation and effects are obtained.

1. The ON period of the switching element is controlled such that the total loss of the transformer is minimized. That is, it is unnecessary to fix the frequency, the ON period of the second transistor, or the like. According to the present disclosure, both the frequency and a ratio of the ON period (duty ratio) are automatically adjusted.

2. It is possible to minimize the loss of the transformer in the entire load range. Since even when the load fluctuates, the loss is automatically adjusted to a minimum frequency and a minimum duty ratio, it is possible to expect an efficiency improving effect in the entire load range.

3. It is possible to correspond by only a control change, without a change of the configuration of the related art.

4. Since the efficient condition is automatically searched for, it is unnecessary to switch the normal load mode to a light load mode. It is necessary for the related art to switch the mode by monitoring the load, but it is not necessary for the present disclosure to do so. Thus, it is unnecessary for the present disclosure to include a load monitoring circuit, a switching circuit, and the like which are necessary in the related art.

5. It is unnecessary to set a fixed value for only the light load mode. It is necessary to include a circuit for setting a fixed value of the frequency, or a fixed value of the ON period of the second transistor, in the light load mode of the related art. However, it is not necessary for the present disclosure to include that.

6. The present disclosure is a configuration which is suitable for a digital control performed by the microcontroller, the FPGA, or the like. The maximum frequency tracking logic is a configuration easy to be realized by the digital control, and it is possible to realize a configuration for realizing the present disclosure without increasing cost.

4. Second Embodiment of Present Disclosure

The first embodiment described above sets the duty ratio in which the frequency is maximized by increasing the duty ratio, as long as the frequency becomes high. A second embodiment is the same as the first embodiment in terms of changing the duty ratio while monitoring the frequency. The second embodiment is controlled so as to be operated by the duty ratio at an area where a slope of the frequency is positive. A configuration of the control circuit is the same as the control circuit 200 in the first embodiment, but control processing performed by the maximum frequency tracking logic circuit 25 is different.

Figure 12:
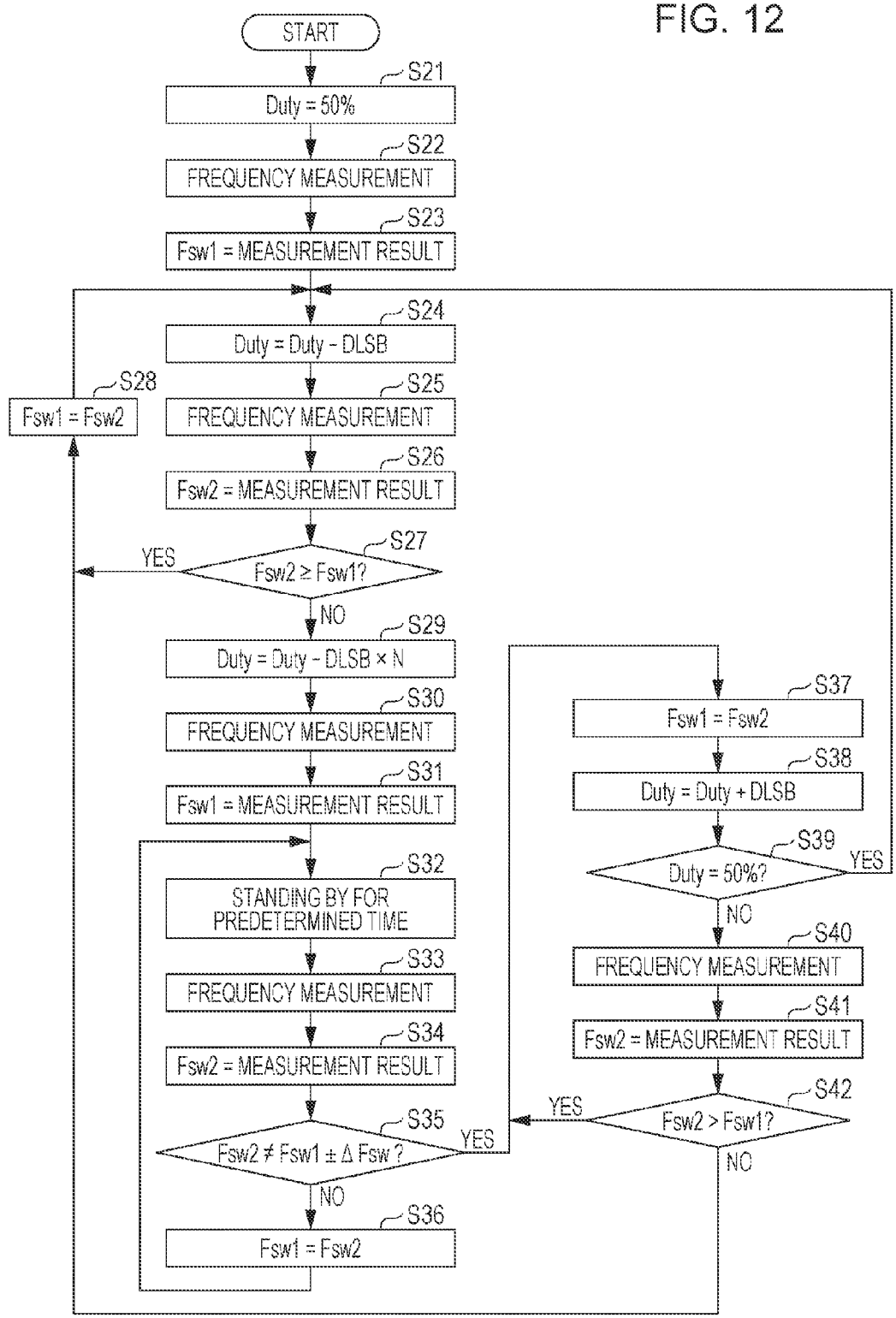
FIG. 12 is a flow chart for explaining control processing of a switching power supply device according to a second embodiment of the present disclosure.

The control processing of the maximum frequency tracking logic circuit in the second embodiment will be described with reference to the flow chart in FIG. 12.

Step S21: The duty ratio at the instant when the switching operation starts is set to 50% in the same manner as in the related art.

Step S22: In this state, the frequency immediately before the duty ratio is changed, is measured.

Step S23: The measured frequency value is substituted for Fsw1, which is a variable.

Step S24: Next, the duty ratio is decreased by an amount of change which is previously set. The amount of change is referred to as DLSB.

Step S25: Thereafter, the frequency is measured after the duty ratio is changed.

Step S26: The measured frequency value is substituted for Fsw2, which is a variable.

Step S27: It is determined whether or not Fsw2 is equal to or greater than Fsw1.

Step S28: In a case where the determined result of step S27 is positive, it means that the frequency becomes high or is not changed by decreasing the duty ratio, and in this case, Fsw2 is substituted for Fsw1. Then the control processing proceeds to the above-described step S24.

By a loop (of step S24→step S25→step S26→step S27→step S28→step S24), the control is performed such that the duty ratio is decreased, as long as the frequency is not lowered. The control processing up to this is the same as that in the first embodiment.

Step S29: In a case where the determined result of step S27 is negative, it means that the frequency is lowered by decreasing the duty ratio. In this case, the control processing proceeds to step S29. The duty ratio is decreased by N times the DLSB which is the amount of change that is previously set. Here, N is a numerical value which is previously set, and is a parameter which determines an amount decreasing from the duty ratio in which the frequency reaches the maximum.

Step S30: the frequency is measured after the duty ratio is changed.

Step S31: Thereafter, the measured frequency value is substituted for Fsw1, which is a variable.

Step S32: Stand by for a predetermined time.

Step S33: The frequency is measured again.

Step S34: The measured frequency value is substituted for Fsw2, which is a variable.

Step S35: It is determined whether or not Fsw2 is changed to be equal to or greater than ±ΔF which is a previously set frequency width from Fsw1.

Step S36: When the determined result of step S35 is negative, it means that the frequency is almost not changed while the predetermined time elapses. In this case, Fsw2 is substituted for Fsw1 and then the processing proceeds to step S32.

By a loop (of step S32→step S33→step S34→step S35→step S36→step S32), the control without changing the duty ratio is performed, as long as the frequency is not changed.

Step S37: When the determined result of step S35 is positive, it means that the frequency is changed from before the predetermined time elapses. When the frequency is changed, it means that an operation state such as a load condition is changed. In this case, it is necessary to search for a new optimal duty ratio. For this reason, Fsw2 is substituted for Fsw1 and the processing proceeds to step S38.

Step S38: The duty ratio is increased by the DLSB that is an amount of change which is previously set.

Step S39: It is determined whether or not the set value of the duty ratio is 50%. In a case where the determined result of the step S39 is positive, the control processing proceeds to step S24 such that the duty ratio is not equal to or greater than 50%.

Step S40: In a case where the measurement result of step S39 is negative, the frequency is measured after the duty ratio is changed.

Step S41: The frequency of the measurement result is substituted for Fsw2, which is a variable.

Step S42: It is determined whether or not Fsw2 is greater than Fsw1. In a case where the determined result of step S42 is positive, it means that the frequency becomes high by increasing the duty ratio. In this case, the control processing proceeds to step S37, Fsw2 is substituted for Fsw1, and then the processing proceeds to step S38.

By a loop (of step S38→step S39→step S40→step S41→step S42→step S37→step S38), the control is performed such that the duty ratio is increased, as long as the frequency becomes high.

In a case where the determined result of step S42 is negative, it means that the frequency is lowered or not changed by increasing the duty ratio. In this case, the control processing proceeds to step S28, Fsw2 is substituted for Fsw1, and further, the control processing proceeds to step S24.

The above-described second embodiment of the present disclosure can find an area where a slope of the frequency change with respect to the duty ratio change is positive, and has the same operation and effects as in the first embodiment described above.

5. Application Example

The present disclosure described above can be applied to a switching power supply device or the like of an electronic apparatus such as an AC adapter, a television receiver or a video game device.

6. Modification Example

As described above, the embodiments of the present disclosure are specifically described, but the present disclosure is not limited to the above-described embodiments, and various modifications can be made based on technical ideas of the present disclosure. For example, the configurations, the methods, the processes, the shapes, the materials, the numerical values, and the like which are described in the above-described embodiments are merely examples, and according to necessity, configurations, methods, processes, shapes, materials, numerical values, and the like which are different from those described in the above-described embodiments may be used.

The first embodiment described above is controlled such that the maximum value of the frequency is searched for, but for example, may be controlled such that the frequency in the vicinity (maximum±10%) of the maximum value may be searched for.

In addition, the present disclosure can also be made by the following configurations.

(1)

A switching power supply device including: a switching element to which a DC input is supplied; a frequency control circuit which controls a switching frequency of the switching element; a frequency detection circuit which detects the switching frequency of the switching element; and a duty ratio control circuit which controls a switching duty ratio based on the frequency detected by the frequency detection circuit, wherein the duty ratio control circuit controls the switching duty ratio such that the switching frequency becomes an approximately maximum frequency.

(2)

The switching power supply device according to (1), in which the duty ratio control circuit operates using the switching duty ratio in an area where a slope of a change of the switching frequency with respect to a change of the switching duty ratio becomes positive.

(3)

The switching power supply device according to (1) or (2), further including: a transformer; a resonance circuit; and a rectification circuit, and in which the switching element is configured by a first switching element and a second switching element which are connected in series and alternately turned on by the switching frequency, in which output currents of the first and second switching elements are supplied to the transformer, in which the resonance circuit is connected to a primary side of the transformer, and the rectification circuit is connected to a secondary side of the transformer, and in which an output voltage is stabilized by a frequency of the switching signal which is controlled by a feedback signal.

(4)

The switching power supply device according to any one of (1) to (3), in which a time of changing the duty ratio is set so as to be longer than a response time which is determined from a band of the feedback signal.

(5)

The switching power supply device according to any one of (1) to (4), in which the duty ratio control circuit typically performs a duty ratio control operation.

(6)

A switching power supply control method of a switching power supply device including a switching element to which a DC input is supplied, a frequency control circuit which controls a switching frequency of the switching element, a frequency detection circuit which detects the switching frequency of the switching element, and a duty ratio control circuit which controls a switching duty ratio based on the frequency detected by the frequency detection circuit, the method including causing the duty ratio control circuit to control the switching duty ratio such that the switching frequency becomes an approximately maximum frequency.

(7)

The switching power supply control method according to (6), in which the duty ratio control circuit operates using the switching duty ratio in an area where a slope of a change of the switching frequency with respect to a change of the switching duty ratio becomes positive.

(8)

An electronic apparatus including a switching power supply device, in which the switching power supply device includes, a switching element to which a DC input is supplied; a frequency control circuit which controls a switching frequency of the switching element; a frequency detection circuit which detects the switching frequency of the switching element; and a duty ratio control circuit which controls a switching duty ratio based on the frequency detected by the frequency detection circuit, and in which the duty ratio control circuit controls the switching duty ratio such that the switching frequency becomes an approximately maximum frequency.

(9)

The electronic apparatus according to (8), in which the duty ratio control circuit operates using the switching duty ratio in an area where a slope of a change of the switching frequency with respect to a change of the switching duty ratio becomes positive.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply device comprising:
    a switching element to which a direct current (DC) input is supplied;
    a frequency control circuit which controls a switching frequency of the switching element;
    a frequency detection circuit which detects the switching frequency of the switching element; and
    a duty ratio control circuit which controls a switching duty ratio based on the switching frequency detected by the frequency detection circuit,
    wherein the duty ratio control circuit controls the switching duty ratio such that the switching frequency becomes an approximately maximum frequency, and
    wherein the duty ratio control circuit operates using the switching duty ratio in an area where a slope of a change of the switching frequency with respect to a change of the switching duty ratio becomes positive.

2. The switching power supply device according to claim 1, further comprising:
    a transformer;
    a resonance circuit; and
    a rectification circuit,
    wherein the switching element is configured by a first switching element and a second switching element which are connected in series and alternately turned on by the switching frequency,
    wherein output currents of the first and second switching elements are supplied to the transformer,
    wherein the resonance circuit is connected to a primary side of the transformer, and the rectification circuit is connected to a secondary side of the transformer, and
    wherein an output voltage is stabilized by a frequency of a switching signal which is controlled by a feedback signal.

3. The switching power supply device according to claim 2, wherein a time of changing the switching duty ratio is set so as to be longer than a response time which is determined from a band of the feedback signal.

4. The switching power supply device according to claim 1, wherein the duty ratio control circuit performs a duty ratio control operation.

5. A switching power supply control method of a switching power supply device including a switching element to which a direct current (DC) input is supplied, a frequency control circuit which controls a switching frequency of the switching element, a frequency detection circuit which detects the switching frequency of the switching element, and a duty ratio control circuit which controls a switching duty ratio based on the switching frequency detected by the frequency detection circuit, the method comprising:
    detecting the switching frequency of the switching element; and
    controlling the switching duty ratio based on the switching frequency detected by the frequency detection circuit such that the switching frequency becomes an approximately maximum frequency,
    wherein the duty ratio control circuit operates using the switching duty ratio in an area where a slope of a change of the switching frequency with respect to a change of the switching duty ratio becomes positive.

6. An electronic apparatus comprising:
a switching power supply device, wherein the switching power supply device includes a switching element to which a direct current (DC) input is supplied;
a frequency control circuit which controls a switching frequency of the switching element;
a frequency detection circuit which detects the switching frequency of the switching element; and
a duty ratio control circuit which controls a switching duty ratio based on the switching frequency detected by the frequency detection circuit,
wherein the duty ratio control circuit controls the switching duty ratio such that the switching frequency becomes an approximately maximum frequency, and
wherein the duty ratio control circuit operates using the switching duty ratio in an area where a slope of a change of the switching frequency with respect to a change of the switching duty ratio becomes positive.

7. The switching power supply control method according to claim 5, further including:
alternately turning on first and second switching elements of the switching element according to the switching frequency;
providing output currents of the first and second switching elements to a transformer; and
stabilizing an output voltage in accordance with a frequency of a switching signal controlled by a feedback signal.

8. The switching power supply control method according to claim 5, wherein a time of changing the switching duty ratio is set so as to be longer than a response time which is determined from a band of a feedback signal.

9. The switching power supply control method according to claim 5, wherein the duty ratio control circuit performs a duty ratio control operation.

10. The electronic apparatus according to claim 6, further comprising:
a transformer;
a resonance circuit; and
a rectification circuit,
wherein the switching element is configured by a first switching element and a second switching element which are connected in series and alternately turned on by the switching frequency,
wherein output currents of the first and second switching elements are supplied to the transformer,
wherein the resonance circuit is connected to a primary side of the transformer, and the rectification circuit is connected to a secondary side of the transformer, and
wherein an output voltage is stabilized by a frequency of a switching signal which is controlled by a feedback signal.

11. The electronic apparatus according to claim 6, wherein a time of changing the switching duty ratio is set so as to be longer than a response time which is determined from a band of a feedback signal.

12. The electronic apparatus according to claim 6, wherein the duty ratio control circuit performs a duty ratio control operation.

13. The switching power supply device according to claim 1, wherein the switching frequency relates to a fixed value of an ON period of the switching element.

* * * * *